United States Patent [19]

Noe

[11] 4,363,468
[45] Dec. 14, 1982

[54] CUTTING TORCH HEIGHT CONTROL APPARATUS

[75] Inventor: Stephen L. Noe, Metamora, Ill.

[73] Assignee: Caterpillar Tractor Co., Peoria, Ill.

[21] Appl. No.: 84,951

[22] Filed: Mar. 20, 1979

[51] Int. Cl.$^3$ .............................................. B23K 7/10
[52] U.S. Cl. ................................. 266/76; 219/124.02; 219/124.03; 318/637; 318/650; 318/670
[58] Field of Search ........................ 148/9 R; 266/76; 219/124.02, 124.03; 318/637, 650, 670

[56]  References Cited

U.S. PATENT DOCUMENTS

| | | | |
|---|---|---|---|
| 2,364,645 | 12/1944 | Mott et al. | 266/76 |
| 2,534,958 | 12/1950 | Deming | 148/9 R |
| 2,949,391 | 8/1960 | Anderson | 148/9 R |
| 3,398,342 | 8/1968 | Redman | 318/650 |
| 3,809,308 | 5/1974 | Roeder et al. | 266/76 |
| 3,823,928 | 7/1974 | Stolin et al. | 266/76 |
| 3,928,790 | 12/1975 | Schmall | 148/9 R |
| 4,156,125 | 5/1979 | Brown | 219/124.02 |
| 4,170,727 | 10/1979 | Wilkins | 219/124.03 |

FOREIGN PATENT DOCUMENTS

| | | | |
|---|---|---|---|
| 2291535 | 6/1976 | France | 266/76 |
| 192001 | 1/1967 | U.S.S.R. | 219/124.02 |

OTHER PUBLICATIONS

Coughanowr et al., Process Systems Analysis and Control, McGraw-Hill Book Co., New York, 1965, pp. 116–117.

Primary Examiner—John P. Sheehan
Attorney, Agent, or Firm—William A. Vansanten

[57] ABSTRACT

An apparatus (10) for controlling the height of one or more cutting torches (12) above a workpiece (14). The apparatus (10) senses the actual height of the torch (12) above the workpiece (14) and compares the actual height with a desired reference height. The apparatus (10) moves the torch (12) up or down until the actual height and reference height are substantially equal. The apparatus (10) is operable in a manual mode, a semi-automatic mode or a fully automatic mode allowing an operator to select a desired degree of control during a cutting operation.

18 Claims, 8 Drawing Figures

FIG. 3.

| DIG IN<br>J1 | BIT | PORT X+0<br>FUNCTION | DIG OUT<br>J1 | BIT | PORT X+1<br>FUNCTION |
|---|---|---|---|---|---|
| 48 | 0 | JOG 1 | 31 | 0 | M1 UP |
| 46 | 1 | JOG 2 | 29 | 1 | M1 DOWN |
| 44 | 2 | JOG 3 | 27 | 2 | M2 UP |
| 42 | 3 | JOG 4 | 25 | 3 | M2 DOWN |
| 40 | 4 | X | 23 | 4 | M3 UP |
| 38 | 5 | X | 21 | 5 | M3 DOWN |
| 36 | 6 | X | 19 | 6 | M4 UP |
| 34 | 7 | X | 17 | 7 | M4 DOWN |
| 47  39 | | ⎫ | 32  24 | | ⎫ |
| 45  37 | | ⎬ 24V | 30  22 | | ⎬ CONTROL |
| 43  35 | | ⎭ RETURN | 28  20 | | ⎭ |
| 41  33 | |  | 26  18 | | |

| DIG IN<br>J1 | BIT | PORT X+2<br>FUNCTION | DIG IN<br>J2 | BIT | PORT X+4<br>FUNCTION |
|---|---|---|---|---|---|
| 16 | 0 | AUTO | 48 | 0 | LSB 1 |
| 14 | 1 | THUMBWHEEL | 46 | 1 | LSB 2 |
| 12 | 2 | X | 44 | 2 | LSB 4 |
| 10 | 3 | LOST CUT | 42 | 3 | LSB 8 |
| 8 | 4 | ALL UP | 40 | 4 | MSB 1 |
| 6 | 5 | PREPOSITION | 38 | 5 | MSB 2 |
| 4 | 6 | X | 36 | 6 | MSB 4 |
| 2 | 7 | X | 34 | 7 | MSB 8 |
| 15  7 | | ⎫ | 47  39 | | ⎫ |
| 13  5 | | ⎬ 24V | 45  37 | | ⎬ 24V |
| 11  3 | | ⎭ RETURN | 43  35 | | ⎭ RETURN |
| 9  1 | | | 41  33 | | |

| DIG OUT<br>J2 | BIT | PORT X+5<br>FUNCTION |
|---|---|---|
| 31 | 0 | AUTO |
| 29 | 1 | MANUAL |
| 27 | 2 | X |
| 25 | 3 | LOST CUT |
| 23 | 4 | ALARM |
| 21 | 5 | TROUBLE |
| 19 | 6 | X |
| 17 | 7 | X |
| 32  24 | | ⎫ |
| 30  22 | | ⎬ +24VDC |
| 28  20 | | ⎭ |
| 26  18 | | |

CUTTING TORCH HEIGHT CONTROL APPARATUS

DESCRIPTION

Technical Field

This invention relates to an apparatus for controlling the height of a cutting torch above a workpiece which is operable in a manual mode, a semi-automatic mode, and a fully automatic mode.

Background Art

In a flame cutting machine one or more gas operated cutting torches are acted on by a drive mechanism which causes the torches to cut along one or more workpieces in accordance with a predetermined pattern. Efficient use of such machines is dependent on maintaining a precise optimum flame height or spacing of the torch from the associated workpiece as heat concentration varies substantially along the length of the flame. If the torch to workpiece spacing varies significantly in the course of cutting a workpiece, a nonuniform or possibly incomplete cut may be made and heat utilization becomes less efficient. The need for adjustment of torch height in the course of a cutting operation may arise from the fact that the workpiece has a nonplanar configuration. Moreover, sensitivity is such that slight unintentional irregularities in the surface of nominally flat plate stock may significantly affect cutting efficiency and accuracy.

In some prior flame cutting machines, adjustment of the flame height during the course of a cutting operation, must be done manually by an operator who continually observes the cutting operation. A fully manual flame height control system has several disadvantages. First, more or less continual attention is required and the operator is thereby prevented from accomplishing other tasks during the sometimes lengthy cutting operations. Second, the operator's task becomes more difficult, and quality of results is adversely affected in proportion to the number of torches employed on the cutting machine. Finally, the quality of the flame height control varies widely among different operators and is less than optimum under the best of circumstances. For these reasons, flame cutting machines are frequently provided with means for automatically controlling torch height during cutting operations.

Such automatic control requires a servomotor for advancing or retracting the torch relative to the workpiece in response to control signals and further requires apparatus for sensing the spacing of the torch from the workpiece surface in order to transmit corrective control signals to the servomotor when necessary.

Torch to workpiece spacing sensing devices employed in prior automatic torch height controls have included a variety of wheels, rollers, runners, sliding contacts and electrical capacitance measuring plates which extend from the torch towards the workpiece. These systems are complex, prone to malfunction and experience maintenance problems and are inherently susceptible to error in the presence of varying conditions, such as slag popping, at the surface of the workpiece. Moreover, such devices do not sense the spacing of the workpiece from the torch at the precise point of contact of the flame therewith but instead sense the spacing at a location displaced to one side of the flame.

Ideally, the sensing devices employed in an automatic torch height control should not require any mechanism extending from the torch to the surface of the workpiece and should act to sense changes in the spacing of the torch and workpiece at the precise point of contact of the flame with the workpiece. Further, such sensing devices should individually control each torch in a multiple bank thereof while providing manual adjustment of the spacing of all torches and manual initiated raising or lowering of all torches simultaneously or individually.

A system for maintaining a predetermined selectable torch to workpiece spacing in a flame cutting machine which does not require sensor structure extending from the torch to the workpiece is described in U.S. Pat. No. 3,823,928 which issued on July 16, 1974 to B. L. Stolin and R. D. Brown. The system is sensitive to minute changes in spacing of the torch from the precise point of contact of the flame with the workpiece. For this purpose, an electrical voltage is applied between the torch and the workpiece and an electrical current travels through the cutting flame. The flame is effectively a variable electrical resistor, the resistance of which is a function of the spacing of the workpiece from the torch. During operation, any variation of the electrical resistance of the flame is detected and a correction signal is generated to actuate a servomotor which restores the torch to workpiece spacing to the desired value. In one form of the system, a plurality of torches are utilized and the height control system provides for manual selection of a basic reference voltage that determines the automatically maintained spacing at all torches from the associated workpieces while further providing for individual fine adjustment of torch to workpiece spacing at each torch. Also in the preferred form, the control system provides a safety shutdown for preventing the automatic height control system from driving a torch towards the workpiece when the flame lengthens abruptly as a result of passing off the edge of the workpiece.

As mentioned the flame is a variable resistor so that the flame generated voltage varies, sporadically at times, with the flame. This voltage is spontaneously generated by the action of the flame on the workpiece. Electronic systems are adversely affected by such sporadic signals generated by the flame. The problem is further compounded where the electrical circuits are analog circuits which are subject to drifting. Where drifting is severe, the system must be calibrated before each use to obtain the desired results. The calibration procedure is time consuming which decreases productivity and increases costs.

The flame will generally vary or flutter because it responds to changes in gas pressures, ambient air currents, and irregularities in the surface of the workpiece. It has been found that an analog system must be calibrated before each use which means the analog system will not be a fully automatic system. It is desirable to have a torch height control which can operate in a manual mode, a semi-automatic mode or a fully automatic mode to allow the operator to exercise that degree of personal attention required for the particular cutting job thereby freeing the operator to perform other tasks as desired during the cutting operation.

Disclosure of Invention

In one aspect of the present invention, an apparatus for controlling the distance of a device from a reference point comprises means for moving the device toward and from the reference point and means for generating a position signal representative of the distance of the device from the reference point and storing the distance information contained in the position signal. A computing means compares the actual position of the device as indicated by the distance information in the storing means with a reference device position and controllably delivers a signal to the moving means. The apparatus is operable in an automatic mode in which the computing means is free to deliver the signal to the moving means and exercise control over the position of the device.

In another aspect of the present invention, an apparatus for controlling the distance of at least one cutting torch from an associated reference point includes means for moving the torch toward and from the reference point and means for generating a position signal representative of the distance the torch is spaced from the reference point. A generating means produces a reference signal representative of a desired distance between the torch and reference point. Means are also provided for comparing the position and reference signals and energizing the moving means to move the torch until the actual torch position substantially equals the desired torch position.

In a further aspect of the present invention an apparatus for controlling the height of at least one cutting torch above an associated workpiece comprises motor means for moving the torch toward and from the workpiece, drive means for directing the motor means to move the torch toward and from the workpiece, and means for generating a digital resistance signal representative of the resistance of the cutting torch flame. Means are provided for operating the apparatus in a manual, semi-automatic or automatic mode. Means are provided for receiving the resistance signal representative of the flame resistance, comparing the torch position with a preselected torch position in the automatic mode, and energizing the drive means and moving the torch until the torch position is substantially equal to the preselected torch position.

The apparatus controls the height of one or more cutting torches above a workpiece by sensing the height of the torch and comparing the actual height with a reference height and moving the torch toward or from the workpiece until the actual height substantially equals the desired height. The apparatus is operable in a manual mode, a semi-automatic mode or a fully automatic mode to allow an operator to exercise any desired degree of control.

BRIEF DESCRIPTION OF THE DRAWINGS

FIG. 3 is a connection diagram;

BEST MODE FOR CARRYING OUT THE INVENTION

Figure 1:
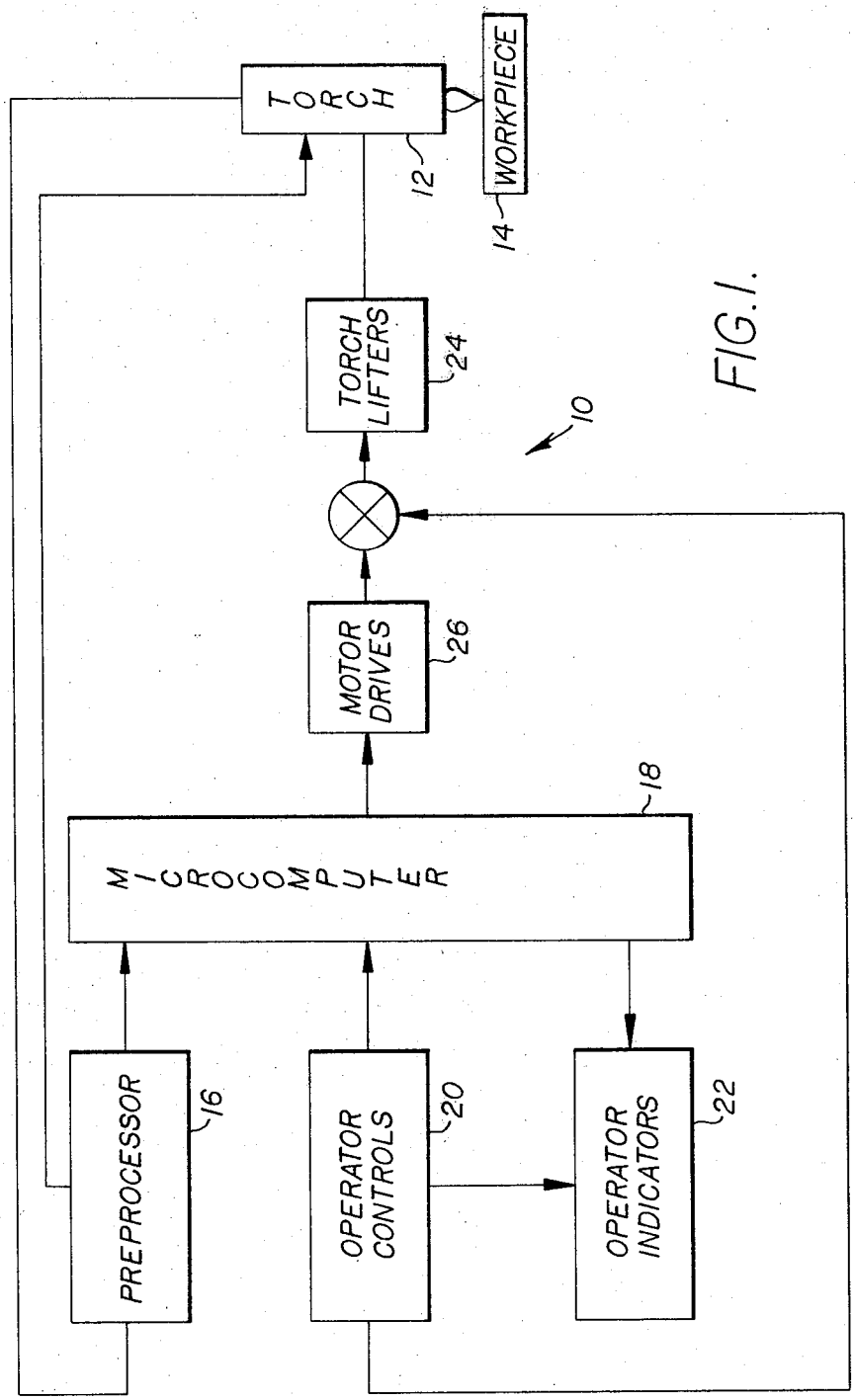
FIG. 1 is a block diagram of an apparatus for controlling the height of a cutting torch above a workpiece.

Referring to FIG. 1, a cutting torch height control system 10 controls the distance of a cutting torch 12 from a workpiece 14. The torch control system 10 includes a signal processor 16 which measures characteristics, such as voltage and current, of the torch flame and generates a signal representative of the resistance of the torch flame. Since flame resistance varies with the distance of the torch 12 from the workpiece 14, the resistance signal from the signal processor 16 is representative of the distance of the torch 12 from the workpiece 14. The resistance information from the signal processor 16 is stored in the memory of a microcomputer 18. The flame also generates a voltage which is sensed and stored in the memory of the computer 18. The flame generated voltage is referred to as the floating voltage because the voltage is present even when there is no current passing through the flame and because the voltage level varies from one operation to the next operation and during each operation due to workpiece temperature and other continually changing variables.

Basically, the signal processor 16 samples the torch flame at a preselected rate at preselected intervals and generates resistance information which is received by the computer 18. The computer 18 averages the information for each sample and compares the averaged data with reference height data generated by controls 20 set by an operator. After the comparison, the computer 18 activates a drive control 26 which activates a torch lifter 24 to move the torch 12 toward or from the workpiece 14 depending on whether the average data indicates that the torch-to-workpiece spacing is less or greater than the spacing indicated by the reference height data. A group of operator indicators 22 indicates the mode of operation, manual, semi-automatic or automatic, of the control system and other conditions as will be hereinafter more fully explained.

Referring to FIGS. 1 and 3, in a preferred embodiment for operating four cutting torches, the microcomputer 18 is an Intel SBC 80/05 with an SBC116 memory and an SBC556 input/output. The computer 18 contains three input ports, X+0, X+2 and X+4, containing pin terminals J1, 33–48, 1–16 and J2, 33–48 and two output ports, X+1 and X+5, containing pin terminals J1, 17–32 and J2, 17–32. Output port X+1 is connected to the motor drives 26 and an up or down signal is delivered to the motor drives for moving the torches up or down, one at a time or all at once. Output port X+5 is connected to the operator indicator panel 22 to activate various operator indicators. The input ports X+0, X+2 and X+4 receive signals from the operator control panel 20.

Each torch lifter 24 is an electric motor or the like and is connected to a respective torch 12 and controlled by a motor drive 26 or by an operator control depending on the particular mode of operation of the control system 10.

Figure 2:
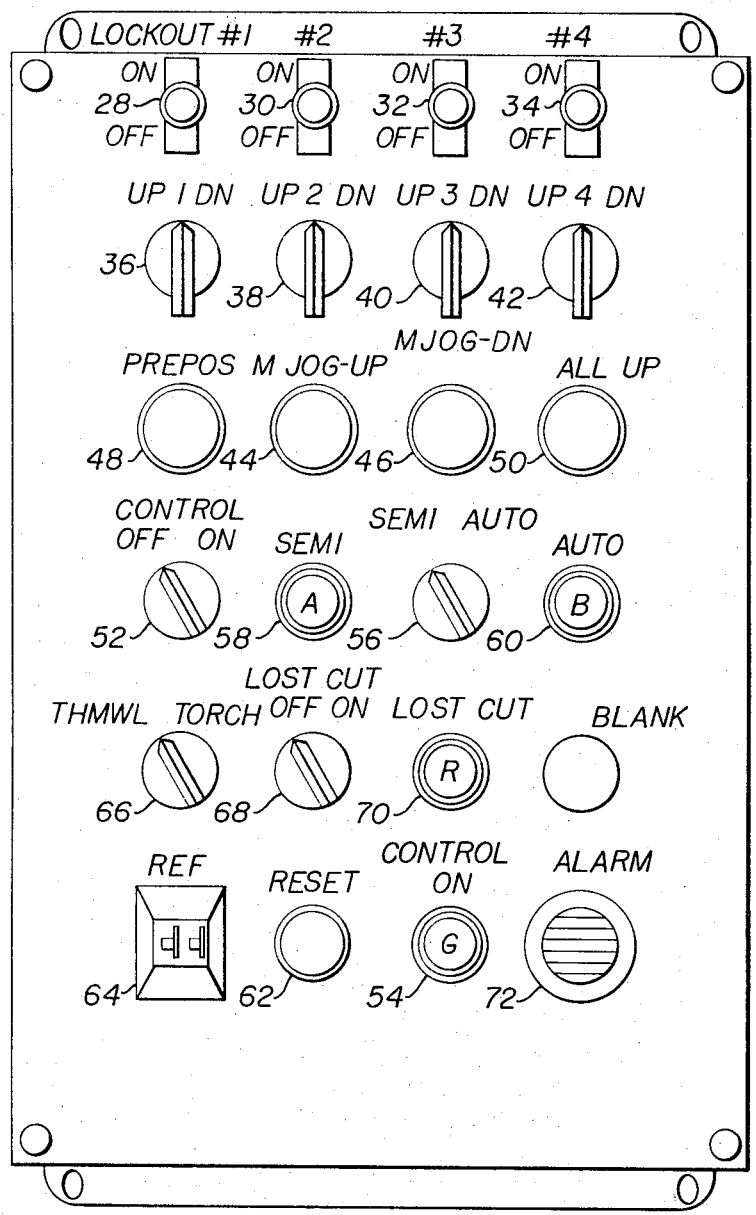
FIG. 2 is a front view of operator controls and indicators.
Figure 4:
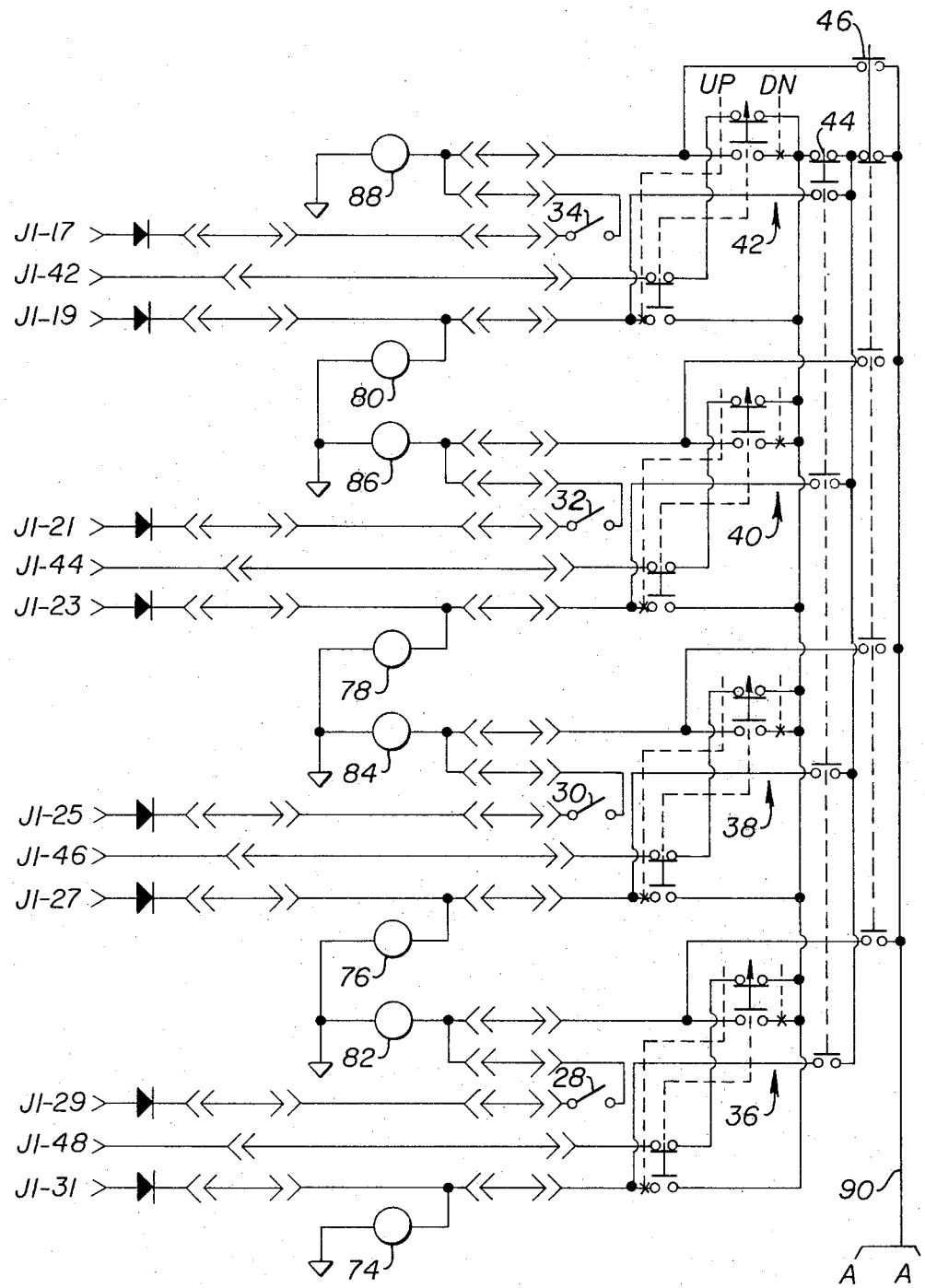
FIG. 4 is a schematic diagram of a portion of the operation controls and is connected to FIG. 5 along line A—A.
Figure 5:
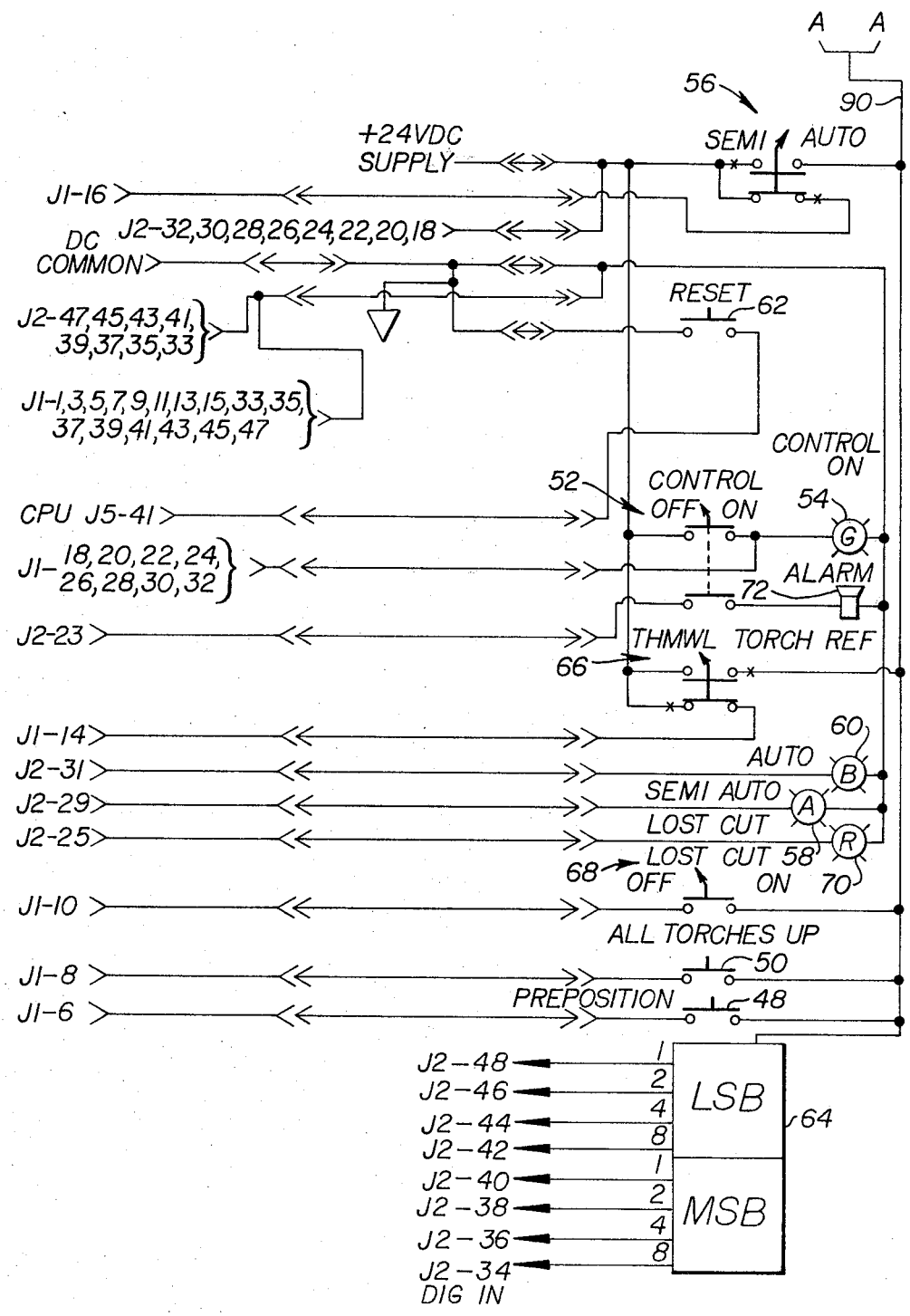
FIG. 5 is a schematic diagram of a portion of the operator controls and is connected to FIG. 4 along line A—A.

Referring to FIG. 2, the operator controls 20 and indicators 22 are conveniently mounted on a single panel. The panel contains four lock-out switches 28,30,32,34, four jog switches 36,38,40,42, a master jog-up switch 44, and an all up switch 50. The panel also contains a control switch 52 and indicator 54, a semi-automatic/automatic switch 56 and indicators 58,60, a reset switch 62, and a thumbwheel switch 64. There is a thumbwheel/torch switch 66, a lost cut switch 68 and visual and audible lost cut indicators 70,72. The associated control circuitry is shown in FIGS. 4 and 5. The four lock-out switches 28,30,32,34 can each disable a respective torch 12 so that the torch remains at its upmost position and not be affected by other operator controls 20. The jog switches 36,38,40,42 are for facilitating movement of the torches, one torch at a time while the master jog switches 44,46 can cause all four torches to move simultaneously. The preposition switch 48 causes the torches to move to a preselected position relative to the workpiece 14. The all up switch 50 is for sending the torches to their upmost position. The control switch 52 and semi-automatic/automatic switch 56 are for determining whether the system operates in the manual, semi-automatic or fully automatic mode as indicated by the control, semi-automatic and automatic indicating lamps 54,58,60. The thumbwheel switch 64 is for setting the reference torch height when the thumbwheel/torch switch 66 is in the thumbwheel position while the jog switches are for setting the reference height when switch 66 is in the torch position. The lost cut switch 68 is for enabling the lost cut indicating lamp 70 and audible alarm 72.

Referring to FIGS. 1–5, with the control switch 52 in the off position, the cutting torches 12 are operated in a manual mode. In the manual mode, the operator moves all the torches 12 up in response to positioning the master jog-up switch 44 of down in response to positioning the master jog-down switch 46. The torches 12 can be individually moved up or down in response to positioning the individual jog switches 36,38,40 and 42.

The motor drive 26 contains eight solid state relays for controlling up and down operation of the torches 12. Relays 74,76,78, and 80 control the upward movement of an associated torch while relays 82,84,86 and 88 control the downward movement of the associated torch. Relays 74,76,78 and 80 are respectively connected to terminals J1-31, J1-27, J1-23 and J1-19 and relays 82,84,86 and 88 are connected to terminals J1-29, J1-25, J1-21, and J1-17 in series with lockout switches 28,30,32 and 34, respectively.

The master jog-up switch 44 is connected to relays 74,76,78 and 80 and cause all the torches to move upward when switch 44 is activated. The master jog-down switch 46 is connected to relays 82,84,86 and 88 and cause all the torches to move downward when switch 46 is activated. A normally closed contact of the master jog-down switch 46 is connected to line 90 and connected in series with a normally closed contact of the master jog-up switch 44 which in turn is connected to the four jog switches 36,38,40 and 42. When all the jog switches are in their normal positions line 90 is connected to terminals J1-42, J1-44, J1-46, and J1-48. These inputs notify the computer that a torch has or has not been manually repositioned.

The control switch 52 has one terminal connected to 24 VDC supply. In the "on" position, the control switch 52 connects the supply voltage to the control lamp 54 and to terminals J1-18,20,24,26,28,30 and 32. The control switch 52 also connects the audible alarm 72 to terminal J2-23. The alarm and indicators 54,58,60 and 70 are all connected to the common 24 V return. When the control switch 52 is in the "off" position, the apparatus 10 operates in the manual mode. The operator can use the jog switches in the manual mode. When the control switch is in the "on" position, the apparatus 10 operates in either the semi-automatic mode or fully automatic mode.

In the semi-automatic mode, the semi-automatic/automatic switch 56 is in the semi-automatic position which connects the 24 VDC supply to line 90. The operator can use the jog switches in the semi-automatic mode as well as the preposition switch 48 and all up switch 50. The preposition switch 48 connects line 90 to terminal J1-6 and the all up switch 50 connects line 90 to terminal J1-8. Operation of the preposition switch 48 frees the thumbwheel 64 for setting a reference position at which the torches will automatically be positioned in response to activating the preposition switch 48. Operation of the all up switch 50 drives the torches to their full up position. The computer 18 does not exercise automatic control over the torch height in the semi-automatic mode, except with regard to the preposition function.

When the switch 56 is in the semi-automatic position, the indicating lamp 58, which is connected to terminal J2-29, is illuminated and when the switch 56 is in the automatic position, the indicating lamp 60, which is connected to terminal J2-31, is illuminated.

In the automatic mode, the switch 56 is in the automatic position, as indicated in FIG. 4, which connected the 24 VDC supply to terminal J1-16. The terminals J1-1,3,5,7,9,11,13,15,33,35,37,39,41,43,45 and 47 and terminals J2-33,35,37,39,41,43,45 and 47 are connected to the 24 VDC common return. Terminals J2-18,20,22,24,26,28,30 and 32 are connected to the 24 VDC supply. The operator jog switches are not operative in the automatic mode; the computer 18 is in full control.

There are two modes of automatic operation. In one mode the thumbwheel/torch reference switch 66 is in the thumbwheel position which connects the 24 VDC supply to terminal J1-14 and enables the thumbwheel 64. Reference heights in the form of digital signals are taken from the thumbwheel 64 and can be changed by the operator as desired. The preposition and all up switches 48,50 are functional in this mode as well as the lost cut switch 68 which connects terminal J1-10 and the line 90. The lost cut indicating lamp 70 is connected to terminal J2-25. This mode of operation is preferable and controls can be left in this position for most cutting operations.

In the second automatic mode, switch 66 is set to the torch reference position which connects the 24 VDC supply to the line 90 and enables the operator jog switches. Height references are taken from actual torch positions as set by the jog switches rather than from the thumbwheel 64. This mode allows individual height references to be maintained for each torch. Other switches function as in the first automatic mode with the reset switch 62 being connected to the computer 18 for resetting the computer 18 when activated.

Figure 8:
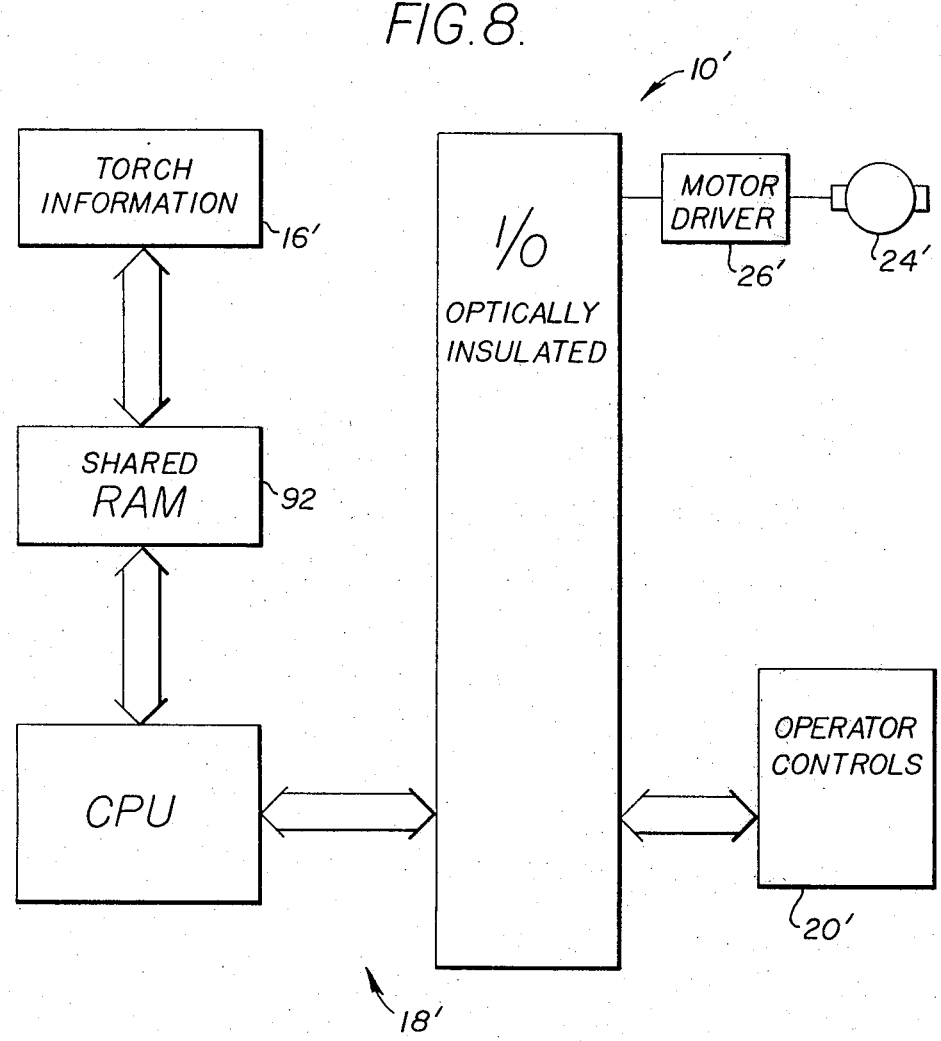
FIG. 8 is a block diagram of an apparatus for controlling the height of a cutting torch above a workpiece similar to FIG. 1 but illustrating another embodiment.

Referring to FIG. 8, an alternate embodiment of the apparatus 10' is shown in which the microcomputer 18' is different than in FIG. 1. The difference is that the microcomputer 18' shares a memory 92 with the signal processor 16'. By this construction, the input/output to the memory 92 can be another microcomputer thereby facilitating the use of the apparatus 10' with other positional apparatus.

Industrial Applicability

Figure 6:
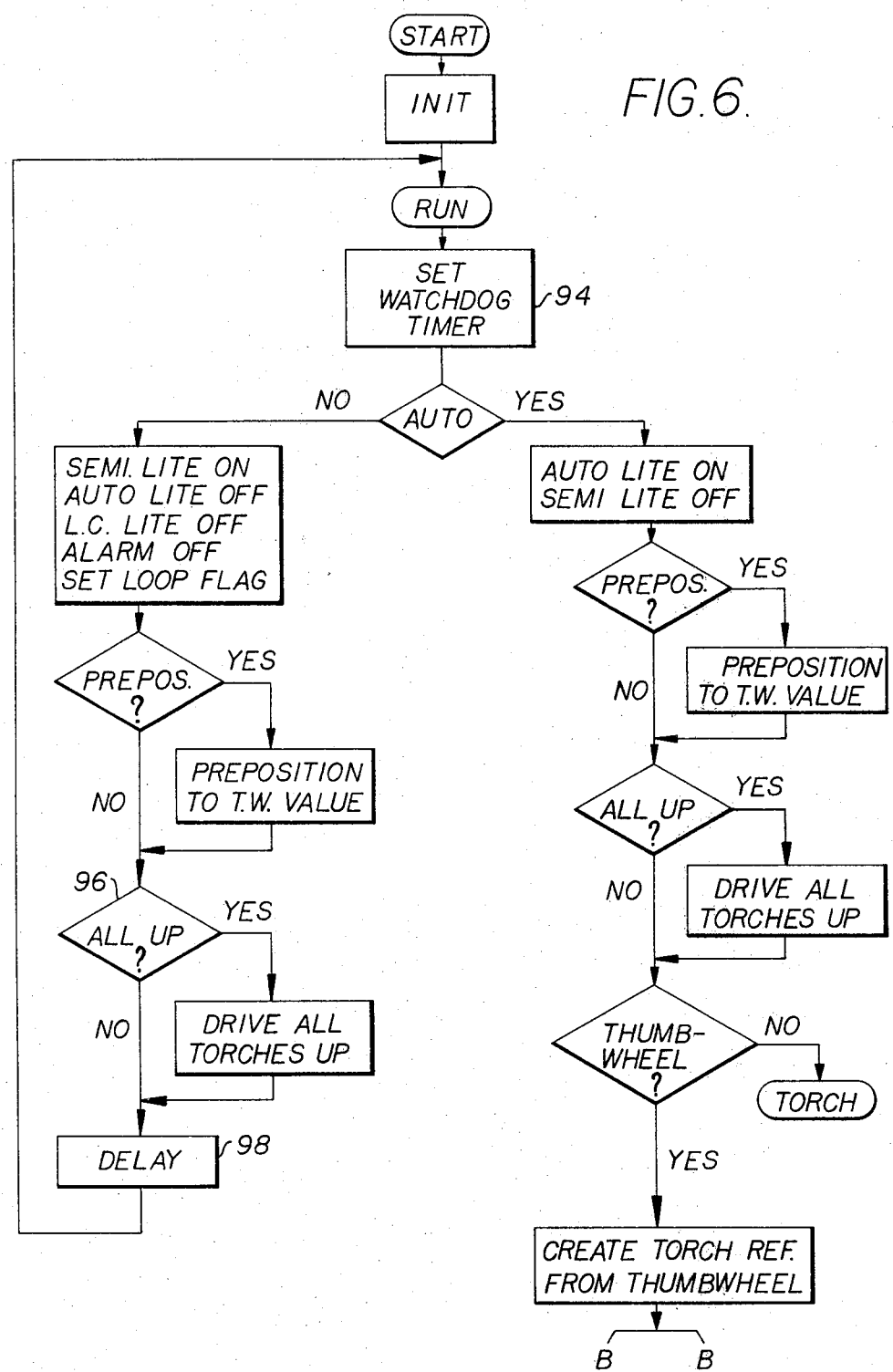
FIG. 6 is a portion of a flowchart illustrating the sequential operation of the apparatus of FIG. 1 and is connected to FIG. 7 along line B—B.
Figure 7:
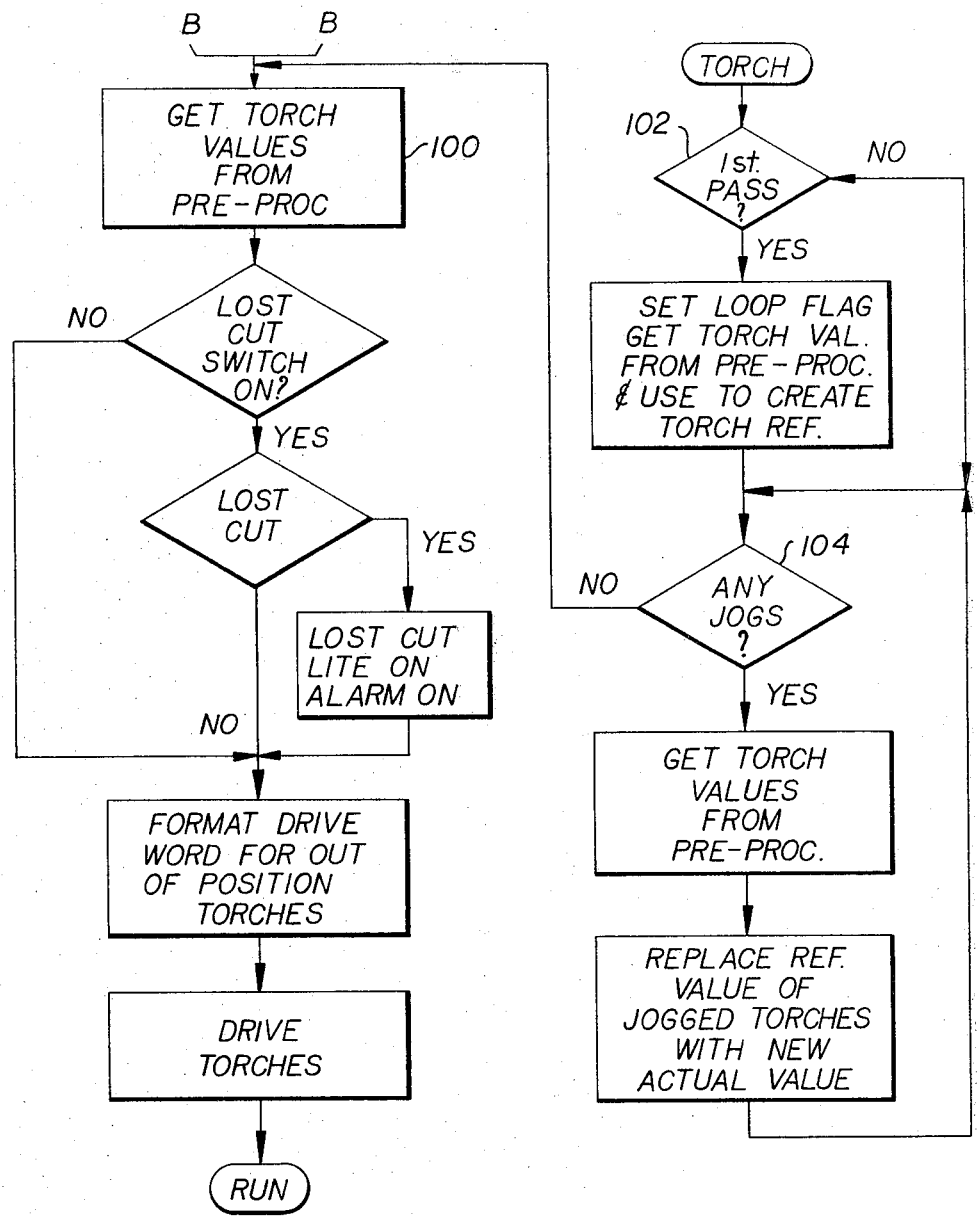
FIG. 7 is the remainder of the flow chart of FIG. 6 and is connected to FIG. 6 along line B—B.

Referring to the flowchart of FIGS. 6 and 7, when the apparatus 10 is turned on, the microcomputer 18 initializes its central processing unit, registers, and input/output ports. A watchdog timer 94 is set for about 150 milliseconds. If the watchdog timer 94 ever times out or if the reset switch 62 is activated, an interrupt signal is generated which functions to restart the program.

If the switch 56 is in the semi-automatic position, the lamp 58 comes on while the lamp 60 is off. The lost cut lamp 70 and audible alarm 72 are off in this mode. If the torches are to be prepositioned by use of the preposition switch 48, the values are read from the thumbwheel 64 and the program progresses to block 96 of the flowchart. If the torches are not prepositioned, the program advances to block 96. At block 96, the torches are all driven to their upmost position if switch 50 has been activated, and the program progresses to block 98. The program advances from 96 to 98 if the switch 50 has not been activated, but the torches maintain their previous positions. At block 98 there is a delay to allow updated torch position data to be obtained, after which the cycle repeats itself by again setting the watchdog timer 94 and operating in the semiautomatic position by the operator.

If switch 56 is in the automatic position, the lamp 60 is "on" and lamp 58 is "off". The program advances as before to detect whether the preposition and all up switches 48,50 have been activated. If preposition switch 48 is activated, a preposition value is read from the thumbwheel 64. After prepositioning, activation of the all up switch 50 will drive all torches to their upmost position. Next, the program scans the thumbwheel/torch switch 66.

If switch 66 is in the thumbwheel position, the torch reference values are taken from the thumbwheel 64 and the actual torch values are obtained from the signal processor 16 at block 100. If the lost cut switch 68 is "on", the lamp and alarm 70,72 are activated when there is a loss of cut. Naturally, there is no visual or audible alarm when the lost cut switch 68 is "off".

Next, an output word is formatted for the torches which are not at the reference position and these out of position torches are driven toward the reference position. The program then repeats itself by setting the watchdog timer 94 and proceeding.

In the automatic mode with the thumbwheel/torch switch 66 in the torch position, the program advances to block 102. If this is the first pass, torch values are obtained from the signal processor 16 and used to create the reference position and the program advances to block 104 to determine if any torches have been jogged to change their position. If this is not the first pass, the program advances to block 104. If there are no jogs, the program proceeds to block 100.

If there is a jog, actual torch values are obtained from the signal processor 16. The reference values of the jogged torches are replaced by the actual torch values and the program advances to block 104 to determine if there are any more jogs.

Referring to FIGS. 1 and 8, the apparatus 10 operates with the information related to torch flame resistance provided to it by the signal processor 16. This information is digitized, consisting of two 8-bit binary words for each torch 12, and passed through a common memory area (92 FIG. 8). This information is in the form of an array that is updated every 50 to 80 milliseconds.

The information consists of one binary word representing torch floating voltage and one word representing torch flame resistance for each torch. The array is preferably accessed periodically about every 30 milliseconds. Bus control is implemented such that data will not be altered while a transfer is in progress. The apparatus 10 forms a local array consisting of resistance and floating voltage information for each torch, plus a reference level for each torch. The reference may come from a thumbwheel position dialed by the operator or from a preset torch position adjusted by the operator.

In the fully manual mode, the operator can jog the torches 12 with the hardwired jog switches 36,38,40,42,44 and 46. The computer 18 tracks the torches 12 but exercises no control.

In the semi-automatic mode, the operator can jog the torches 12 as desired. He can take advantage of the preposition and all up features which allow the torches 12 to automatically drive until they detect the workpiece 14 and stop at a preselected height, or to drive to the upmost position and stop at the torch of the respective preposition or all up switch 48 or 50. In the preposition mode, if positioning cannot be accomplished within an established time frame, preposition will be aborted and the torches will return to the full up position. The computer 18 will still not exercise automatic control over torch height in the semi-automatic mode.

In the fully automatic mode using the thumbwheel 64, the computer 18 is in full control of the torch position. The operator jog switches 36,38,40,42,44 and 46 are not operative. Height references are taken from the thumbwheel switch 64 and can be changed as desired. All operator options such as preposition, all up, and lost cut are functional. The apparatus 10 can be left in this mode under most circumstances of torch operation. This is desirable because it requires a minimum of operator intervention.

In the fully automatic mode using torch reference position of the thumbwheel/torch switch 66, the apparatus basically functions as described immediately above except that the height references are derived from actual torch positions established by the operator rather than from the thumbwheel 64. These torch references are established by using the operator jog switches 36,38,40,42,44 and 46 which are activated when switch 66 is in the torch reference position. This mode of operation allows individual height references to be maintained for each torch.

In the full automatic mode, freeing of operator time is a prime consideration. The preposition capability is available using the preposition switch 48. The lost cut feature, using the lost cut switch 68, is available which allows the apparatus 10 to sound the alarm 72 or exercise direct control when it is sensed that one or more torches that were cutting have lost the cut. This sensing is accomplished by monitoring the torch floating voltage, which has been found to experience an abrupt negative-going transition upon loss of cut. These torches will continue to track the workpiece 14, even though they are not cutting, so long as the frame is present. The lost cut condition is defined as a preselected combination of flame resistance and floating voltage. The ability to detect a loss of cut is important for fully automatic machines such as NC/CNC units.

In the case of an extinguished torch, or any torch left unlit, the apparatus recognizes the no flame condition and drives the affected torches to the upward most position. The edge of the workpiece 14 is also detected and the affected torches are driven to the upward most position in preparation for the next cut. When the edge is encountered the flame current approaches zero.

Control of the torch lifters 24 is of a proportional nature. A large error in position, determined by a large differential between the actual torch resistance and the reference value, causes rapid torch motion to reduce the error. A small error in position causes the torch to travel in small increments with a pause between steps to allow updating the actual torch resistance. Where the error exceeds a preselected value, the torch travels rapidly until the error is reduced below the preselected value. This prevents the torch from overshooting the desired position. Also, the torch preferably travels at the same rate of speed in both the up and down positions which is accomplished by increasing speed in the up direction to compensate for the effects of gravity on the torch. Since updating occurs in excess of twelve times per second, excellent control of torch position results from this method.

For normal cutting operations, it is desirable to place the apparatus 10 in the automatic mode at the beginning of a run and leave it in the automatic mode until a new set up is required. Due to the default up design, the torches will always be in the upmost position, out of the operators way, except when actually tracking the workpiece 14.

While the apparatus 10 has been described as it particularly relates to a cutting torch 12, the apparatus 10 works equally well with other devices operated with servo-motors or other means and for which position signals can be obtained. For example, the apparatus 10 could be used to control a drill or other machine tool. The depth of the drill bit into a workpiece could be controlled by generating a signal representative of actual depth and dialing the desired depth on the thumbwheel 64. Likewise, the speed of the drill could be controlled.

One implementation of the flowchart of FIGS. 6 and 7 yields the following program for the Intel SBC 80/05 in hexadecimal form:

```
10080000F30031803F3E20D3033E99D3A3D3A7AF5B
10081000D3A1D3A532103E32703ED303F300CD42B4
10082000B3E01D302DBA22FE601C25E083E0000B0
10083000D3A13A103EF602E6E6D3A532103E3220AE
100840003EDBA22FE620C4B60ADBA22FE610C4943A
100850000ACD240B3E00D302CD240BC31C083A1052
100860003E00F601E6FDD3A532103EDBA22FE620C6
08087000C4B60ADBA22FE6105A
10087800C4940ADBA22FE602CAA208DBA42FCD3952
100880000ACD5B0ACDDB0800AFD302CD0109CD91BB
1008980009CD070BCD240BC31C083A203E00B7CA6C
1008A800B408AF32203ECDDB08CD4A0ADBA000EE0B
1008B800F0CA8C084700CD420BDBA0EEF0CACC088A
1008C800B0C3BC08780032403ECDDB08CD6C0AC30B
1008D800B40800CD240B003E20D030604210040B9
0908E80011003F7E0023EB772391
1008F100EB7E23EB772323EB05C2EB08AFD303C9D0
10090100AF0032803EDBA22FE608C21A093A103E40
100911000E6E7D3A532103EC90E040021003F4690
1009210000237E2323A7FA3C09FE02FA3C090D00AD
10093100C220093A803EA7CA0E09C97800FE64D2D6
100941002F093A103EF618D3A532103E32803E7977
10095100FE04CA8409FE03CA7809FE02CA6C093A78
080961000B3F00C600320B3F02
10096900C32F093A083F00C60032083FC32F093A8E
1009790005 3F00C60032053FC32F093A023F00C6B2
1009890000032023FC32F09000E0000AF32603E3231
1009990005 03E21003F460023230C79FE01CABD09C0
1009A900FE02CAC509FE03CACD09FE04CAD509AFAC
1009B900032703EC91601001E02C3DD091604001E6D
1009C90008C3DD091610001E20C3DD091640001EEC
0909D9080C3DD093A703E00A75D
1009E200784623C2F809FE64D2260A9000CA9E09FC
1009F200DA1D0AD2010AFE6400D20A0AC3ED09FE18
100A020020000FE06FA120A3A603E00B332603E6D
100A12003A503E00B332503EC39E09FEFF0000FE34
100A2200FAF22E0A3A603E00B232603E3A503E007E
100A3200B232503EC39E094700E6F00F0F0F4F0738
```

```
100A420007814F78E60F81C906040021003F7E002E
090A52002323772305C2500AC9D1
100A5B000604004F21003F230023712305C2620AC5
100A6B00C90E0000160121003F3A403E00A2C28B86
100A7B000A2323237A0007570C79FE04C8C3740A90
100A8B007E0023237723C37F0A3E5500D3A106D0D4
100A9B003E0200D3A5CD330B3E00D3A5CD330B05C2
100AAB00C29B0AD3A13A103ED3A5C9DBA4002FCD1C
100ABB00390ACD5B0A3EA032203E32303E00327006
090ACB003EDBA22FE610C2FD0A79
100AD400CD240B3E00D3A5CDDB08CD91093A503E81
100AE400B7CAFD0AD3A1CD330B3A603ED3A13E026F
100AF400D3A53A303E3DC2C50AAF00D3A13A103E59
100B0400D3A5C93A503E00D3A1CD330B3A503EE6AB
100B14005521603EB6D3A1CD330B3A603ED3A1C973
100B2400CD420B0011000F1B007AB3C22B0BC9CDB1
100B3400420B001100081B007AB3C23A0BC93E46AF
090B440000D3003EFFD3043EBFC4
070B4D00D3053EC6D300C929
00000001FF
*
```

The same flowchart could obviously be implemented with any number of programs.

Other aspects, objects and advantages of this invention can be obtained from a study of the drawings, the disclosure and the appended claims.

I claim:

1. An apparatus (10) for controlling the distance of at least one cutting torch (12) from an associated reference point (14), comprising:
    means (24, 26) for moving the torch (12) toward and from the reference point (14);
    means (16) for generating a position signal representative of the distance the torch (12) is spaced from the reference point (14);
    means (64) for generating a reference signal representative of a preselected distance between the torch (12) and the reference point (14);
    means (18) for comparing the position and reference signals and energizing the moving means (24, 26) for moving the torch (12) until the actual torch position substantially equals the preselected torch position, said torch (12) moving at a variable speed according to the difference between the actual and desired torch positions; and
    means (68, 70, 72) for indicating a loss of cut when said torch is positioned relative to a workpiece such as to cut the same, and yet is not causing a cut.

2. An apparatus (10) for controlling the spacing of at least one cutting torch (12) from an associated workpiece (14), comprising:
    means (24,26) for moving the torch (12) toward and from the workpiece (14);
    means (16) for generating a signal representative of the resistance of the cutting torch flame;
    means (64,66) for generating a signal representative of a preselected torch position;
    means (52) for operating the cutting torch (12) in a manual mode in which the torch (12) is free for movement toward and from the workpiece (14) at the control of an operator;
    means (56) for operating the cutting torch (12) in a semi-automatic mode in which the torch (12) is free for movement toward and from the workpiece (14) at the control of an operator and in which the torch (12) automatically moves a maximum distance from the workpiece (14) in response to an operator command and in which the torch (12) automatically moves to a preselected position in response to an operator command;
    means (56) for operating the cutting torch (12) in a fully automatic mode in which the cutting torch (12) is automatically maintained at a preselected position; and
    means (18) for receiving the cutting torch flame resistance signal, comparing said signal with the signal representative of a preselected torch position, and energizing the moving means (24,26) and moving the torch (12) until said signals are substantially equal, said signals being substantially equal in response to the actual torch position being substantially equal to the preselected torch position.

3. An apparatus (10), as set forth in claim 2, wherein the cutting torch (12) moves at a first rate of travel in response to the difference between the actual torch position and the preselected torch position being greater than a preselected amount and the cutting torch moves at a second rate of travel less than said first rate of travel in response to the difference between the actual torch position and the preselected torch position being less than the preselected amount.

4. An apparatus (10), as set forth in claim 2, wherein the rate of travel of the cutting torch (12) in the automatic mode is variable and responsive to the difference between the actual torch position and the preselected torch position.

5. An apparatus (10), as set forth in claim 2, wherein the means (64,66) for generating a signal representative of a preselected torch position includes a switch (64) which generates a digital reference height signal.

6. An apparatus (10), as set forth in claim 2, including means (68) for detecting a loss of cutting torch flame and driving the torch (12) from the workpiece (14).

7. An apparatus (10), as set forth in claim 2, including means (70,72) for indicating a loss of cut, although a flame is still present.

8. An apparatus (10) for controlling the spacing of at least one cutting torch (12) from an associated workpiece (14), comprising:

motor means (24) for moving the torch (12) toward and from the workpiece (14);

drive means (26) for directing the motor means (24) to move the torch (12) toward and from the workpiece (14);

means (16) for generating a signal representative of the resistance of the cutting torch flame;

means (52) for operating the cutting torch (12) in a manual mode in which the torch (12) is free for manual movement toward and from the workpiece (14) by the operator;

means (56) for operating the cutting torch (12) in a semi-automatic mode in which the torch (12) is free for movement toward and from the workpiece (14) at the control of an operator and in which the torch (12) automatically moves a first distance from the workpiece (14) in response to an operator command and in which the torch (12) automatically moves to a preselected position in response to an operator command;

means (56) for operating the cutting torch (12) in a fully automatic mode in which the cutting torch (12) is automatically maintained at a preselected position relative to the workpiece (14); and means (18) for receiving the signal representative of the cutting torch flame resistance, comparing the actual torch position as represented by said signal with a preselected reference torch position in the automatic mode, and energizing the drive means (26) and moving the torch (12) until the actual torch position is substantially equal to the preselected reference torch position in the automatic mode.

9. An apparatus (10) as set forth in claim 8, wherein the cutting torch (12) moves at a first rate of travel in response to the difference between the actual torch position and the reference torch position being greater than a preselected amount and the cutting torch (12) moves at a second rate of travel less than said first rate of travel in response to the difference between the actual torch position and the reference torch position being less than the preselected amount.

10. An apparatus (10) for controlling the distance of a device (12) from a reference point (14), comprising:

first means (24) for moving the device (12) toward and from the reference point (14);

second means (26) for directing the first means (24) to move the device (12) toward and from the reference point (14);

third means (16) for generating a position signal representative of the distance of the device (12) from the reference point (14);

means (18) for storing the distance information represented by the position signal;

means (64,66) for producing a reference position for the device (12);

computing means (18), interfaced with the storing means (18) and second means (26), for comparing the actual position of the device (12) as indicated by the distance information in the storing means (18) with the reference device position and controllably delivering a signal to the second means (26);

means (52) for operating the apparatus (10) in a manual mode in which the reference position is set manually and the computing means (18) blocks the signal to the second means (26);

means (56) for operating the apparatus (10) in a semi-automatic mode in which the device (12) is free to be manually moved to any position, moved to the reference position on command by an operator, and moved a first distance from the reference point (14) on command by the operator, said computing means (18) blocking the signal to the second means (26) except on command by the operator;

means (56) for operating the apparatus (10) in an automatic mode in which the computing means (18) is free to deliver the signal to the second means (26) and exercise control over the position of the device (12).

11. An apparatus (10), as set forth in claim 10, wherein the means (64,66) for producing the reference position of the device (12) includes a thumbwheel switch (64) which generates a digital output signal.

12. An apparatus (10), as set forth in claim 10, including means (58,60) for indicating the mode of operation.

13. An apparatus (10) for controlling the distance of at least one cutting torch (12) from an associated reference point (14); comprising:

means (24, 26) for moving the torch (12) toward and from the reference point (14);

means (16) for generating a position signal representative of a the distance the torch (12) is spaced from the reference point (14);

means (64) for generating a reference signal of a preselected distance between the representative torch (12) and the reference point (14); and means (18) for comparing the position and reference signals and energizing the moving means (24,26) for moving the torch (12) until the actual torch position substantially equals the preselected torch position, said torch (12) moving at a variable speed according to the difference between the actual and desired torch positions, said comparing means being operable to cause said moving means to move the torch toward said preselected position (a) at a relatively rapid velocity when there is a difference between the actual and desired torch positions in excess of a preselected value, and (b) in small increments when there is a relatively small difference between the actual and desired torch positions less than said preselected value.

14. A cutting torch control system, comprising:

means for moving a cutting torch toward and away from a workpiece to effect a cutting operation on the workpiece by the flame of the torch;

means for sensing a characteristic of the cutting operation;

means connected to said sensing means for exercising control of the cutting operation in response to the sensed characteristic;

means connected to one said sensing means and said control exercising means for determining when the torch is failing to cut the workpiece; and means connected to said determining means for providing a signal, when the torch is positioned to cut the workpiece, that the torch is failing to cut the workpiece.

15. The cutting torch control system of claim 14 wherein said signal providing means comprises an alarm.

16. A cutting torch control system, comprising:

means for moving a cutting torch toward and away from a workpiece to effect a cutting operation on the workpiece by the flame of the torch;

means for sensing a characteristic of the cutting operation;

means connected to said sensing means for exercising control of the cutting operation in response to the sensed characteristic;

means connected to said determining means for providing a signal that the torch is failing to cut the workpiece, said signal providing means causing said moving means to maximize the distance between the torch and the workpiece to provide a visual indication that the torch is failing to cut the workpiece.

17. An apparatus for controlling the distance between at least one cutting torch and an associated reference point comprising:

means for moving the torch toward and away from the reference point;

means for causing the moving means to pre-position the torch at a first pre-selected distance from the reference point;

means for generating a signal representative of the actual distance between the torch and the reference point; and means connected to at least one of said causing means and said generating means for directing said moving means to move the torch to a second pre-selected distance from the reference point when the moving means has not moved the torch to said first pre-selected distance within a predetermined time period.

18. The apparatus of claim 17 wherein said second pre-determined distance is more remote from said reference point than said first pre-determined distance.

* * * * *

UNITED STATES PATENT AND TRADEMARK OFFICE
CERTIFICATE OF CORRECTION

PATENT NO. : 4,363,468
DATED : December 14, 1982
INVENTOR(S) : Stephen L. Noe

It is certified that error appears in the above-identified patent and that said Letters Patent are hereby corrected as shown below:

Column 7, line 26, please add after "semiautomatic" --mode until the switch 56 is put in the automatic--.

Column 14, line 28, please delete the letter "a" after "of".

Signed and Sealed this

Twenty-second Day of March 1983

[SEAL]

Attest:

GERALD J. MOSSINGHOFF

Attesting Officer

Commissioner of Patents and Trademarks